United States Patent [19]

Nezu

[11] Patent Number: 4,974,022
[45] Date of Patent: Nov. 27, 1990

[54] IMAGE FORMING APPARATUS

[75] Inventor: Yukihiro Nezu, Tokyo, Japan

[73] Assignee: Kabushiki Kaisha Toshiba, Kawasaki, Japan

[21] Appl. No.: 389,597

[22] Filed: Aug. 4, 1989

[30] Foreign Application Priority Data

Aug. 5, 1988 [JP] Japan .................................. 63-195466

[51] Int. Cl.⁵ .......................................... G03G 21/00
[52] U.S. Cl. .................................... 355/230; 355/231; 355/243
[58] Field of Search ............... 355/243, 230, 311, 231, 355/75

[56] References Cited

U.S. PATENT DOCUMENTS 4,585,332  4/1986  Shenoy ................................ 355/243
4,692,019  9/1987  Morimoto et al. .............. 355/75 X
4,851,883  7/1989  Ito ................................... 355/243 X Primary Examiner—A. T. Grimley
Assistant Examiner—Sandra L. Hoffman
Attorney, Agent, or Firm—Cushman, Darby & Cushman

[57] ABSTRACT

An image forming apparatus comprises an original table for carrying an original with an image thereon, an original cover for covering the original table along with the original thereon, image carriers, an optical scanning system for optically scanning the original on the original table and forming an image corresponding to the image of the original on the image carrier, two optical detectors which is are simultaneously moved for scanning the original table with the original thereon. The two optical detectors independently detect at predetermined positions the presence or absence of the original on the original table, and output signals indicative of the presence or absence of the original at the predetermined positions. The apparatus also includes a discriminating circuit for discriminating the size of the original by finding out the logical sum of the signals from the two detectors.

10 Claims, 14 Drawing Sheets

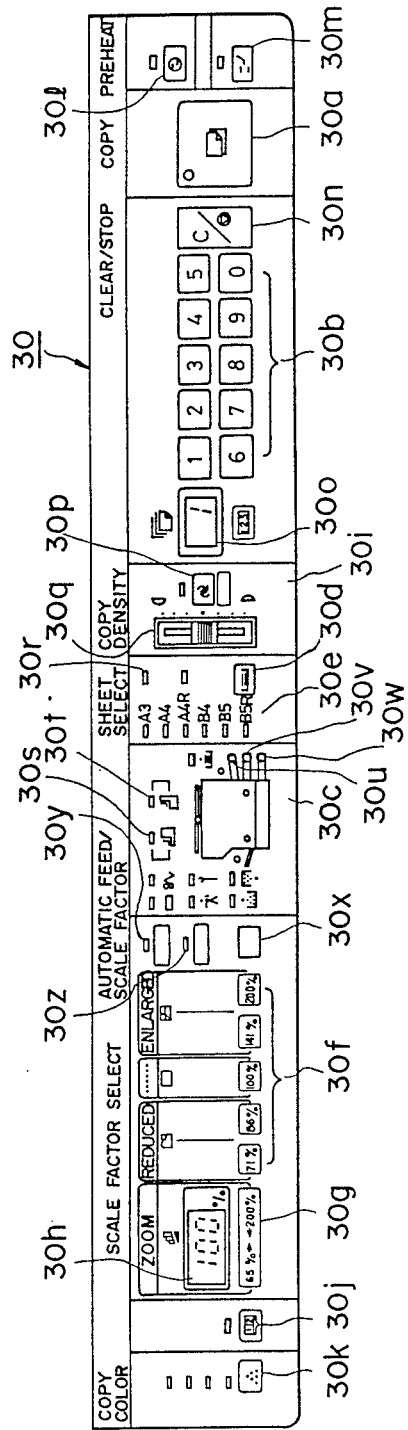
F I G. 7

FIG. 15

| DETECTING POSITION / DETECTOR ORIGINAL SIZE | T | | U | | V | | W | | X | | Y | | Z | |
|---|---|---|---|---|---|---|---|---|---|---|---|---|---|---|
| | 63a | 63b | 63a | 63b | 63a | 63b | 63a | 63b | 63a | 63b | 63a | 63b | 63a | 63b |
| A3 | ○ | ○ | ○ | ○ | ○ | ○ | ○ | ○ | ○ | ○ | ○ | ○ | ○ | ○ |
| B4 | ○ | ○ | ○ | ○ | ○ | ○ | ○ | ○ | ○ | ○ | ○ | ○ | × | × |
| A4-CROSSWISE | ○ | ○ | ○ | ○ | ○ | ○ | ○ | ○ | ○ | ○ | × | × | × | × |
| B5-CROSSWISE | ○ | ○ | ○ | ○ | ○ | ○ | ○ | ○ | × | × | × | × | × | × |
| A4-LENGTHWISE | ○ | ○ | ○ | ○ | ○ | ○ | × | × | × | × | × | × | × | × |
| B5-LENGTHWISE | ○ | ○ | × | × | × | × | × | × | × | × | × | × | × | × |
| A5-CROSSWISE | × | ○ | × | ○ | × | ○ | × | × | × | × | × | × | × | × |
| A5-LENGTHWISE | ○ | ○ | × | × | × | × | × | × | × | × | × | × | × | × |

IMAGE FORMING APPARATUS

BACKGROUND OF THE INVENTION

1. Field of the Invention

The present invention relates to an image forming apparatus, such as an electronic copying machine, having an original size detecting device for automatically detecting the size of an original on an original table.

2. Description of the Related Art

As is generally known, some electronic copying machines include a device for automatically detecting the size of the original to be copied.

In devices of this type, an original table upon which the original is placed is covered with an openable original cover. The inside of this cover is tinged with a color highly sensitive to a photosensitive drum. When the original is irradiated with light of a wavelength whose reflection factor for the color of the original cover is low, the size of the original is detected utilizing differences in the intensity of light reflected from the original and light reflected from the original cover. The length of the original in the scanning direction is obtained by moving a single detector underneath the lower surface of the table and detecting the point of change of the intensity of a reflected light beam.

In this case, however, the information for the original length with respect to the scanning direction is obtained from only the output of one detector. If an image of a color of a low-reflection factor exists on the original, the original may be mistaken for the original cover.

SUMMARY OF THE INVENTION

An object of the present invention is to provide an image forming apparatus in which the influence of low-reflection factor images on original is minimized and the reliability of original size detection is improved. According to the present invention, information for the length of the original in at the scanning direction is obtained from the logical sum of the outputs of a plurality of detectors. Using multiple detectors, the reliability of the original size detection is improved, and the automatic selection of paper sheets corresponding to the detected size of the original is practical.

BRIEF DESCRIPTION OF THE DRAWINGS

FIGS. 1 to 15 illustrate a copying machine as an image forming apparatus according to an embodiment of the present invention, in which:

FIG. 1 is a flow chart illustrating an operation for original size detection;

FIG. 3 is a schematic diagram of an outline of the electronic copying machine;

FIG. 4 is a schematic diagram showing the interior of the copying machine;

FIG. 5 a perspective view of an arrangement of a sheet feeding unit removed from a housing of the apparatus;

FIG. 6 is an exploded perspective view showing the way the sheet feeding unit is mounted on the copying machine;

FIG. 7 is a plan view of a control panel;

FIG. 8 is a perspective view schematically showing a drive mechanism for an optical system;

FIG. 9 is a perspective view schematically showing a drive mechanism for indexes;

FIG. 10 is a sectional view showing an original detector;

FIG. 11 is a view showing the reflection-based spectral characteristics of white and pale blue;

FIG. 12 is a diagram of the operation of the original detector;

FIG. 13 is a diagram showing the relationships between the original size and detecting positions;

FIG. 14 is a diagram showing the principal part of a control circuit; and

FIG. 15 is a diagram logically showing discrimination data used for the original size detection.

DETAILED DESCRIPTION OF THE PREFERRED EMBODIMENT

An embodiment of the present invention will now be described in detail with reference to the accompanying drawings.

Figure 3:
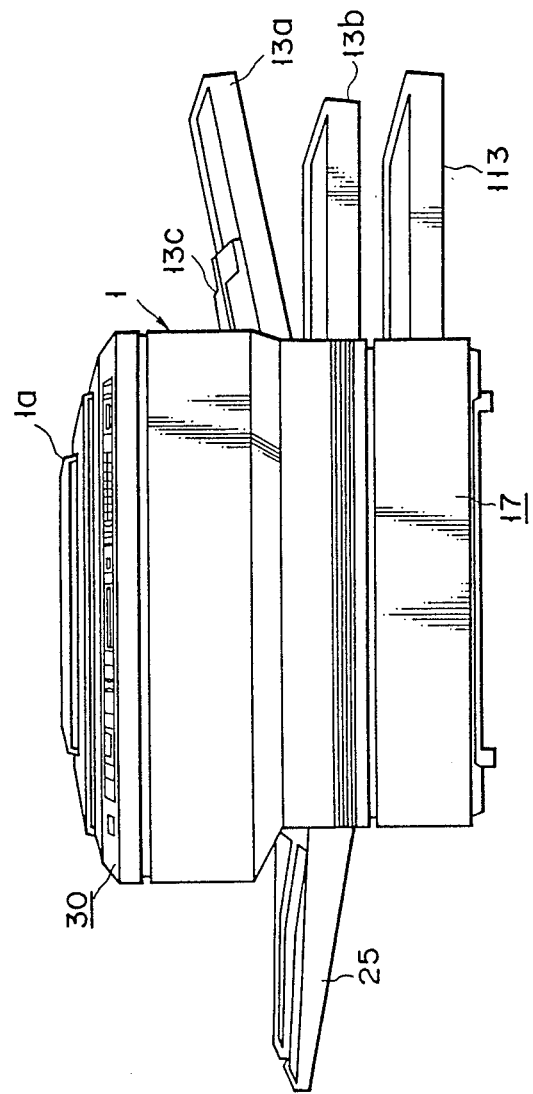
Figure 4:
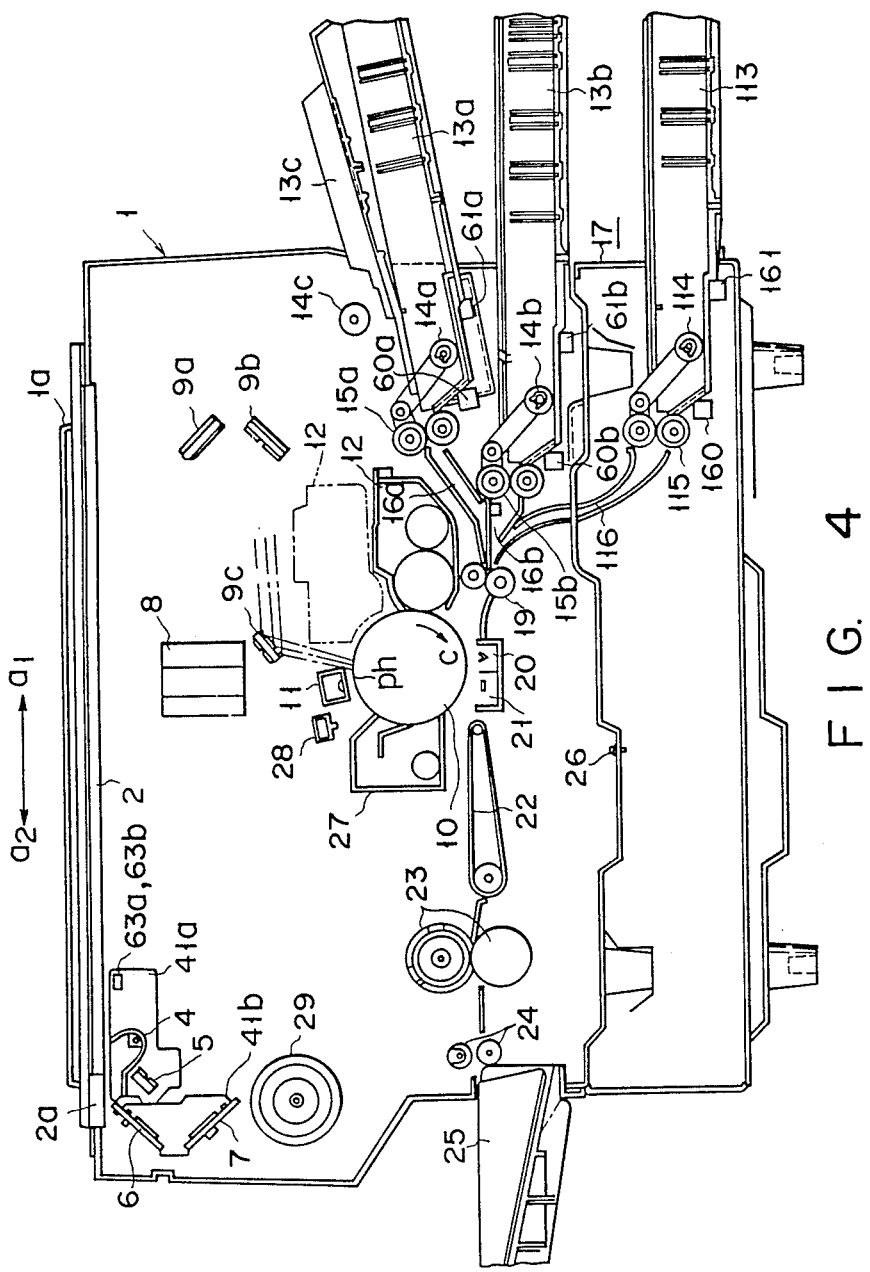

FIGS. 3 and 4 schematically show an image forming apparatus, e.g., an electronic copying machine. An original table 2, made of transparent glass and used for holding an original, is fixed to the top of copying machine housing 1. Fixed scale 2a, which serves as a reference for setting the original, is attached to the left-hand end of table 2. An openable original cover 1a is provided, whereby the upper surface of the table can be exposed and concealed.

The original on original table 2 is scanned with an optical system. The optical system, which includes exposure lamp 4 and mirrors 5, 6 and 7 travels in the directions of arrows a1 and a2 beneath the surface of table 2. In order to maintain a predetermined optical path length, mirrors 6 and 7 are moved at half the speed of mirror 5. The light of lamp 4, after being reflected from the original, is reflected successively by mirrors 5, 6 and 7, is transmitted through lens block 8 for scale factor changing, is reflected successively by mirrors 9a, 9b and 9c, and is focused on the surface of photosensitive drum 10.

Photosensitive drum 10 is rotated in the direction of arrow c of FIG. 4, first, its surface is charged by main charger 11. The image is then exposed in exposure region Phl so that an electrostatic image is formed on the surface of drum 0. Toners are adhered to the electrostatic image on the drum by means of developing device 12, which is removably set in copying machine housing 1.

Code information (not shown), indicative of the color of the toner in developing device 12, is indicated on a side face of device 12. When device 12 is set in housing 1, the code information is read by means of a sensor (not shown) attached to housing 1, whereby the toner color can be automatically discriminated.

Paper sheets onto which the image is to be copied are taken out one by one from selected upper sheet cassette 13a, lower sheet cassette 13b, or third (additional) sheet cassette 113 by means of pickup roller 14a, 14b or 114 and a pair of rollers 15a, 15b or 115. Each taken-out sheet is guided to a pair of aligning rollers 19 through sheet guide path 16a, 16b or 116. The sheets are then delivered to a transfer region by roller 19.

Figure 5:
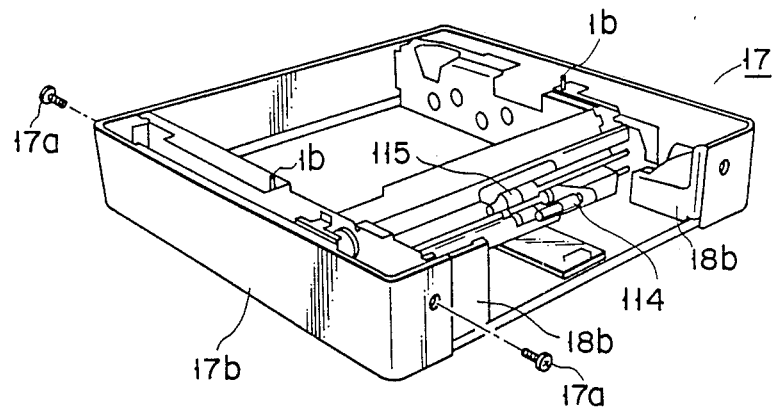
Figure 6:
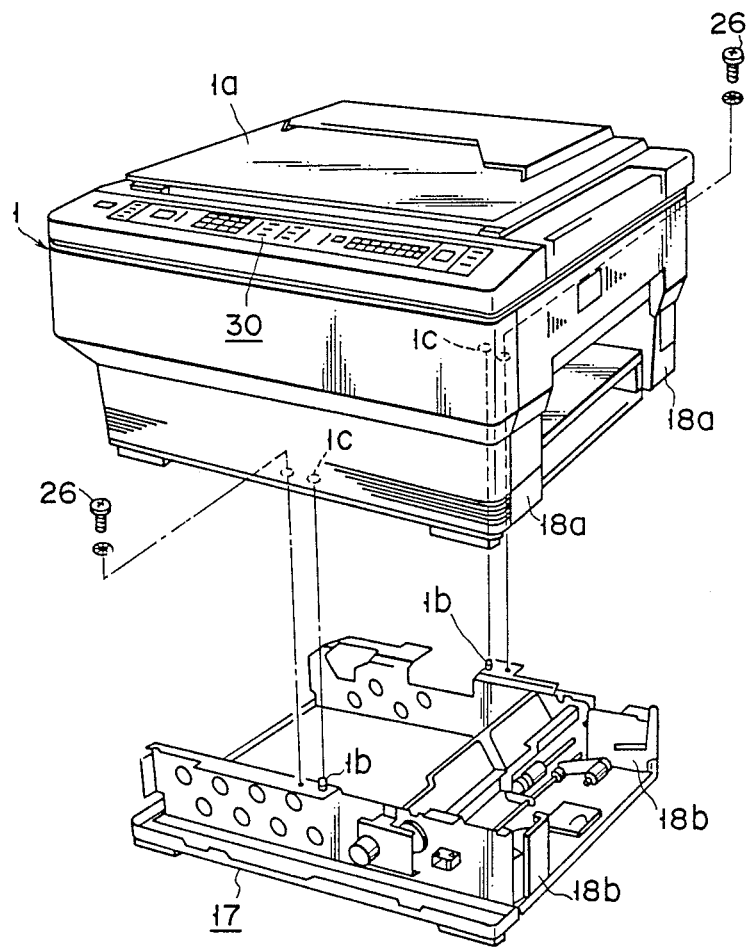

Sheet cassettes 13a and 13b are removably attached to the right-hand bottom portion of housing 1. Third sheet cassette 113 is removably attached to the right-hand side portion of sheet feeding unit 17, which is used as an option of copying machine housing 1. As shown in FIGS. 5 and 6, cover 17b fixed by means of screws 17a is removable, and engaging holes 1c and guide cassettes 18a on the side of housing 1 are aligned with engaging projections lb and guide cassettes 18b on the side of unit 17, respectively. Feeding unit 17 is fixed to housing 1 by means of screws 26. Sheet cassettes 13a, 13b and 113 can be alternatively selected for use by means of a control panel. Whether cassettes of predetermined sizes are mounted in place is determined by means of cassette size detecting switches 60a, 60b, and 160 attached to cassettes 13a, 13b and 113, respectively. Switches 60a, 60b and 160 are each composed of a plurality of microswitches which are turned on and off as the cassettes of different sizes are inserted. The presence of paper sheets in sheet cassettes 13a, 13b and 113 is detected by means of empty detectors 61a, 61b and 161, respectively. Detectors 61a, 61b and 161 are each formed of a reflector-type optical sensor which includes, for example, a light emitting element for emitting light toward the paper sheets and a light sensing element for receiving reflected light from the sheets.

Sheets-bypass guide 13c is also provided on the top portion of sheet cassette 13a. A paper sheet manually inserted through guide 13c is delivered to rollers 15a by pickup roller 14a, and is then transported in the same manner as the sheets fed from cassette 13a.

The paper sheet delivered to the transfer region is brought into intimate contact with the surface of photosensitive drum 10 at the position corresponding to transfer charger 20, and a toner image on drum 10 is transferred to the sheet by the action of charger 20. After the transfer, the sheet is electrostatically separated from drum 10 by the action of separation charger 21, and is transported, by conveyor belt 22, to a pair of fixing rollers 23 at the terminal end of the belt. As the sheet passes through fixing rollers 23, the transferred image is fixed to the sheet. The sheet is then discharged onto tray 25 outside housing 1 by means of a pair of exit rollers 24.

After the transfer process, toner particles remaining on photosensitive drum 10 are removed by means of cleaner 27. Any residual image on drum 10 is erased by means of discharge lamp 28, so that the drum is restored to its initial state. In FIG. 4, numeral 29 designates a cooling fan for preventing the temperature inside housing 1 from increasing.

FIG. 7 shows control panel 30 on housing 1. Numeral 30a designates a copy key; 30b, a tenkey pad; 30c, a display section; 30d, a cassette select key; 30e, a cassette indicating section; 30f, scale factor setting keys; 30g, a zoom key; 30h, a scale factor display section; and 30i, a density setting section. Copy key 30a is operated to give an instruction for the start of copying operation. Tenkey pad 30b is used to set the number of copies. Display section 30c indicates the operating states of various parts, jamming of the sheets, and other operation information. Selection key 30d is operated to select upper, lower, and third sheet cassettes 13a, 13b and 113. Indicating section 30e indicates the size of the sheets in the selected cassette. Setting keys 30f are used to set copy scale factors for enlarged or reduced scales in predetermined relations. Zoom key 30g is used to adjust the copy scale factor in a user-determined variable manner. Display section 30h indicates the currently programme scale factor. Setting section 30i is used to set the copy density.

A consecutive-page copy key 30j is used to set a consecutive-page copy function. A color selector key 30k selects color copying. A preheat key 30 is pressed for establishing and cancelling a preheated state. An interrupt key 30m is pressed for interrupting copying in the middle of continuous copying. A clear key 30n, when operated once, functions as a clear/stop key for correcting the number of copies or termination of copying operation. When clear key 30n is operated twice, it functions as an all-clear key for cancelling set copying conditions, such as the copy number, copy scale factor, etc. A registered number display section 30o designates a registered number display section for indicating the copy number and the like. An automatic exposure key 30p is located at density setting section 30i for automatically setting the copy density. An exposure setting control 30q manually sets the copy density. Cassette display section 30e includes manual feed indicator 30r for indicating that paper sheets are set on sheet-bypass guide 13c. Display section 30c includes indicators 30s and 30t for indicating the original setting direction. Indicators 30u, 30v and 30w indicate the absence of sheets in sheet cassettes 13a, 13b and 113, respectively.

A key 30x selects between automatic paper selection mode (APS mode), automatic magnification selection mode (AMS mode), and manual mode. In the APS mode, the size of the original is read, and sheets of a size corresponding to the original size are automatically selected. In the AMS mode, the copy scale factor is automatically selected in accordance with the original size and the sheet size. When key 30x is depressed, the operation mode is switched from APS mode, to AMS mode, to manual mode . Indicators 30y and 30z indicate the establishment of APS and AMS modes, respectively.

Figure 8:
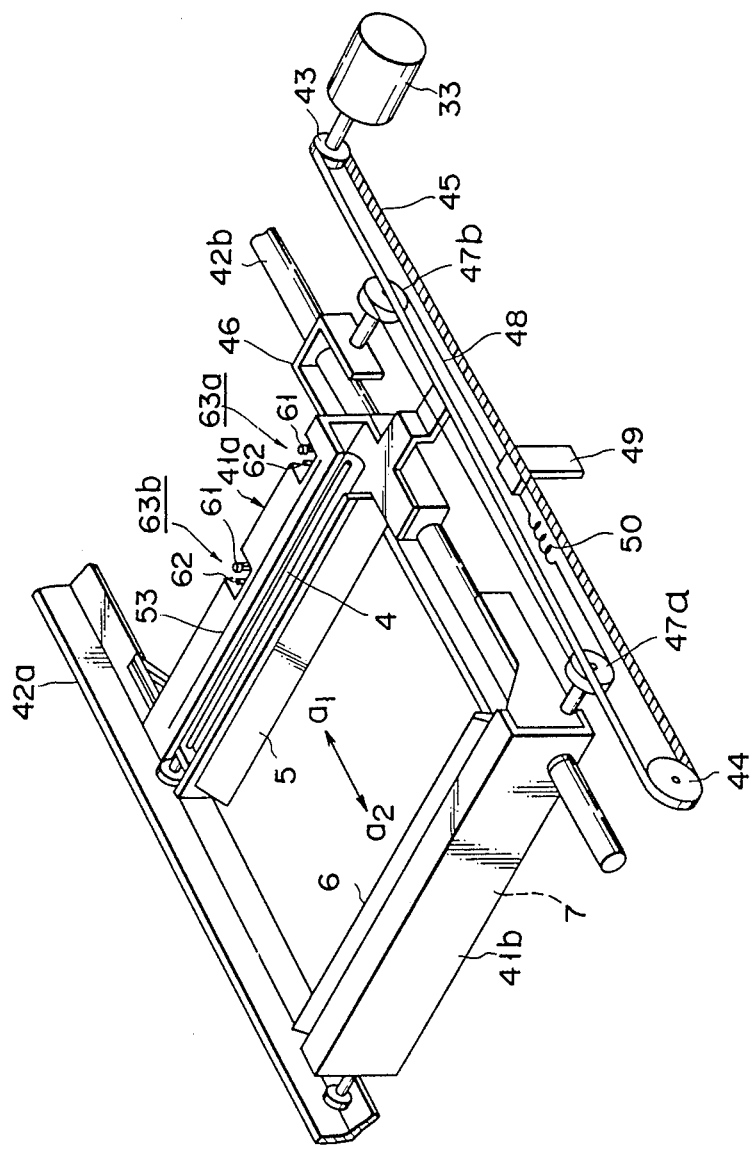

FIG. 8 shows a drive mechanism for moving the optical system. Mirror 5 and exposure lamp 4 are supported by first carriage 41a, while mirrors 6 and 7 are supported by second carriage lb. Carriages 41a and 41b, which are guided by a pair of parallel guide rails 42a and 42b move in the directions of arrows a1 and a2. Four-phase pulse motor 33 is used to rotate pulley 43. Endless belt 5 is passed around and between pulley 43 and idle pulley 44. One end of first carriage 41a, which supports mirror 5, is fixed to the middle portion of belt 45.

Two pulleys, 47a and 47b, are disposed with fixed spacing in the direction of rail 42b. Pulley 47a is rotatably mounted on second carriage 41b. Second carriage 41b supports mirrors 6 and 7. Pulley 47b is rotatably mounted on first carriage 41a on guide portion 46. Wire 48 is passed around and between pulleys 47a and 47b such that one end of wire 48 is fixed to fixing portion 49 and the other end is connected to portion 49 via coil spring 50.

The one end of first carriage 41a is fixed to the top middle portion of wire 48. The bottom middle portion of wire 48 is connected to fixing portion 49. Fixing portion 49 is in turn connected to endless belt 45. Therefore, as pulse motor 33 is rotated, belt 45 rotates to move carriage 41a. Because pulley 47a on second carriage 41b functions as a running block on guide rail 42a, carriage 41b is moved in the same direction as first carriage 41a but at half the speed. The moving direction of each carriage is controlled by changing the rotating direction of pulse motor 33.

A copiable area on the table can be indicated to the user in the following manner. When the sheet size designated by cassette select key 30d is given by (Px, Py), and when the copy scale factor designated by scale factor setting key 30f or zoom key 30g is given by variable K, the range (x, y) on the original is given by $x=Px/K$ and $y=Py/K$. The length of range (x, y) in the x-direction (transverse direction of the housing) is indicated on original table 2 by the distance between indexes 51 and 52. The length of range (x, y) in the y-direction (longitudinal direction of the housing) is indicated by the distance between fixed scale 2a and scale 53 (see FIG. 8).

Figure 9:
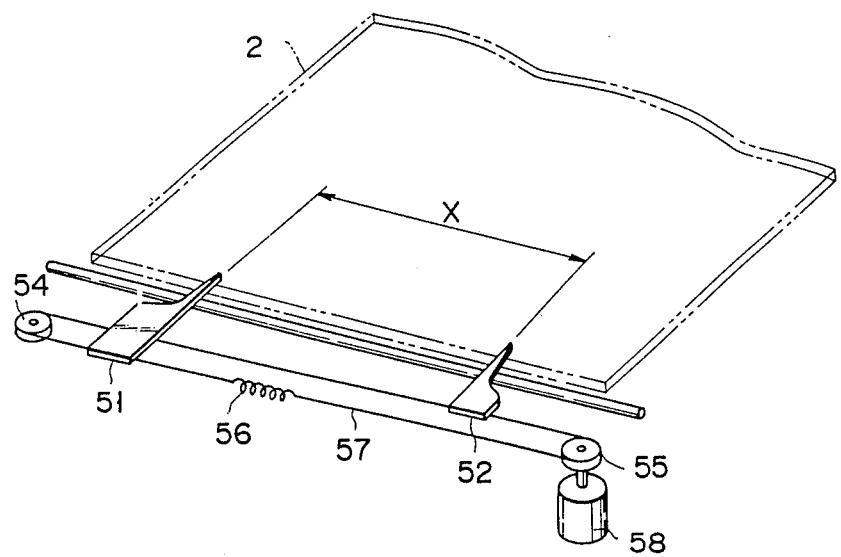

As shown in FIG. 9, indexes 51 and 52 are fixed to different portions of looped wire 57, which, having spring 56, is passed around and between pulleys 54 and 55. Pulley 55 is rotated by means of motor 58. The distance between indexes 51 and 52 can be changed by driving motor 58, in accordance with the x-direction length of the copiable area obtained as aforesaid.

As motor 33 is driven in accordance with the sheet size and the copy scale factor, first carriage 41a is moved to a predetermined position (home position corresponding to the scale factor).

As shown in FIG. 8, first carriage 41a is provided with original detectors 63a and 63b, which are each composed of light sensing element 61, such as a photosensor, and light emitting element 62, such as a light emitting diode. The original detectors are arranged at predetermined positions in the x-direction. When copy key 30a is operated, detectors 63a and 63b detect the presence or absence of an original at the home position before the original scanning. The presence of the original is determined with respect to the direction of the movement of first carriage 41a, which is changed in accordance with the result of this detection.

Figure 10:
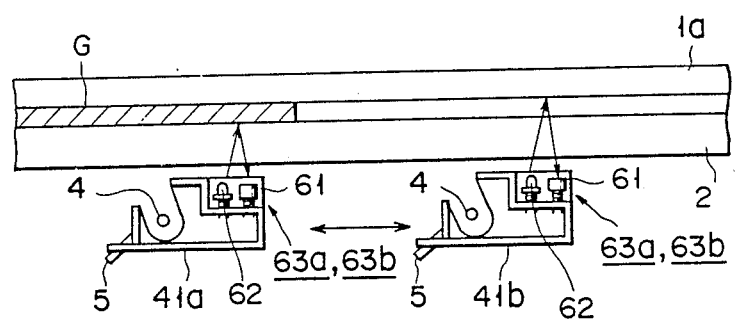
Figure 11:
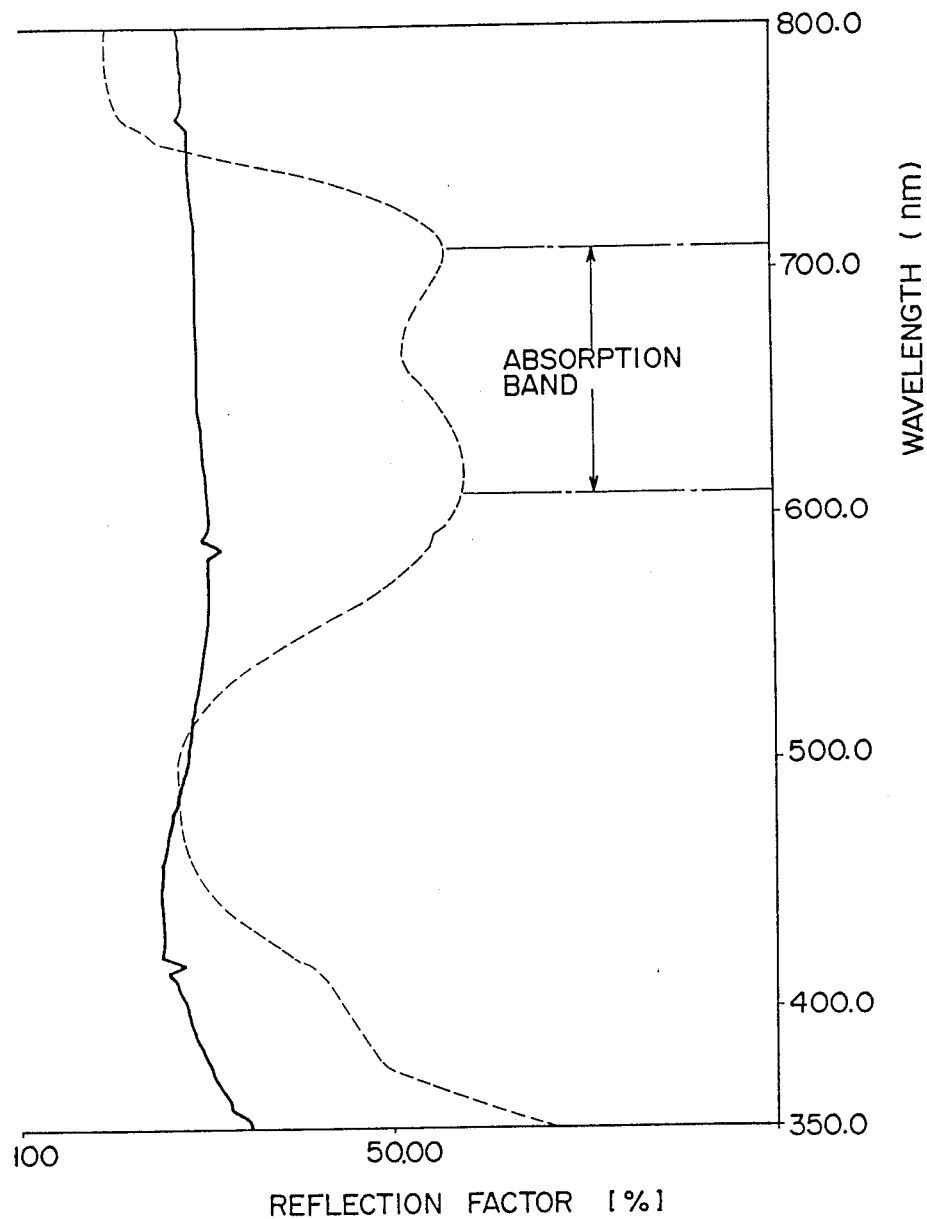
Figure 12:
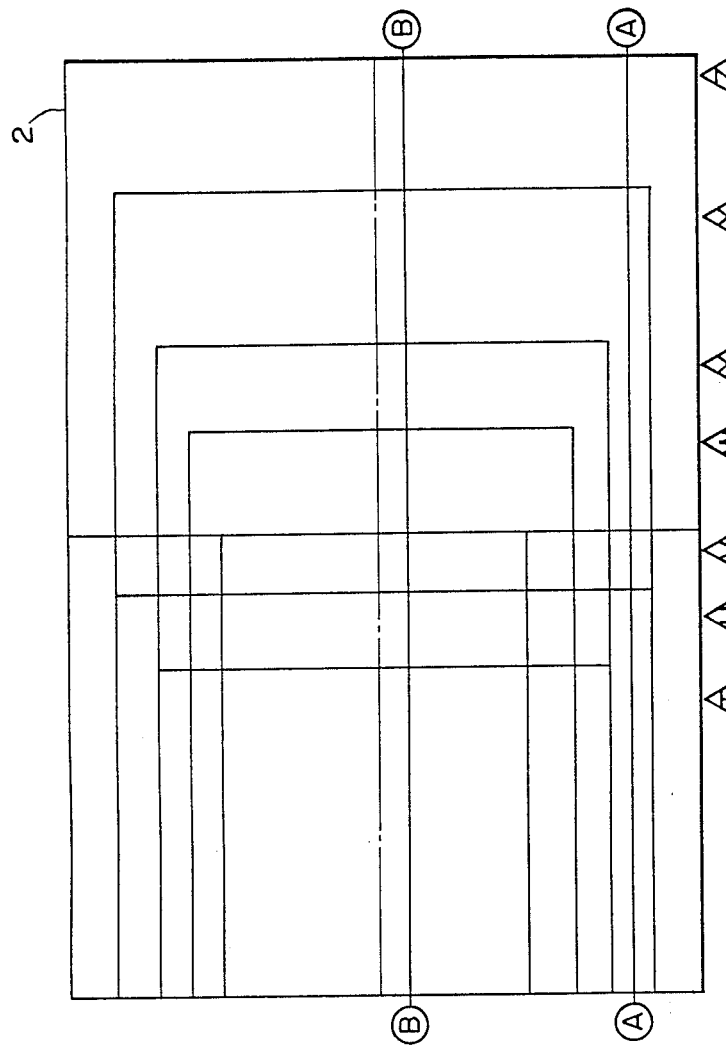

FIGS. 10 to 12 are diagrams for illustrating original detectors 63a and 63b. As shown in FIG. 10, the light from light emitting elements 62 is reflected off original (white original) G and original cover 1a, is transmitted through table 2, is received by light sensing elements 61, and is converted into electrical signals which correspond to the reflection factors of original G and cover 1a. These signals are supplied to a main processor group for use as discriminating means to detect the size of the original sheet.

The whole or part of the inside portion of original cover 1a is tinged with a color such that the light reflected from the cover is of a wavelength to which photosensitive drum 10 is sensitive. For example, if drum 10 is formed of a selenium-based photoconductor the inside portion of cover 1a may be tinged with pale blue. Because selenium-based photoconductor drums are highly sensitive to blue light, when the inside of cover 1a is colored pale blue and when a halogen lamp is selectable as exposure 1a mp 4, the inside portion of cover 1a appears substantially equal to white. Thus, the borders of the original do not appear on the copy image (copy output) due to the choice of the color of original cover 1a.

The light emitting elements of the original detectors, on the other hand, emit a light of a different wavelength. The wavelength of this light is chosen so that the reflection factor off original cover 1a is low. As seen from FIG. 11, the reflection factor from a pale blue surface is about half that from a white surface (indicated by solid line), when the incident light has a wavelength of about 600.00 nm to 700.0 nm (red or yellowish brown). Thus, if photosensitive drum 10 is formed of a selenium-based photoconductor, if the inside portion of original cover 1a is tinged with pale blue, and if the wavelength of the incident light beam from light emitting element 62 is adjusted to red or yellowish brown, original G can be easily discriminated from the pale blue cover 1a by a difference in reflection factor. A low-priced, commercially available, amorphous silicon photodiode for detecting visible light can be used without influencing the copy image.

As shown in FIG. 12, original detectors 63a and 63b are situated so as to be able to scan original table 2 along straight lines A—A and B—B, respectively. For example, the length of the original in the direction perpendicular to the scanning direction is detected by the output of detector 63a, and the original length in the scanning direction is detected by the logical sum of the respective outputs of detectors 63a and 63b. Thus, incorrect detection can be prevented despite the existence of a black image in the scanning position.

Originals of sizes "A5" to "A3" can be set on original table 2. Any of the originals can be set symmetrically with respect to the center line (indicated by dashed line in FIG. 12) of table 2 as a base line. Detecting positions designated by symbols T, U, V, W, X, Y and Z in FIG. 12 are positions taken by first carriage 41a at the time of the original size detection. Of the two original detectors; 63a and 63b, on first carriage 41a, decetor 63b is situated near the center of the table. Detector 63a, on the hand, is situated toward an end of original table 2. Because detector 63b can detect the length of any original in the scanning direction, detector 63a need only be situated to discriminate between originals whose lengths are equal in the scanning direction but whose lengths are not equal in the direction perpendicular to the scanning direction, e.g., originals of sizes "A4-lengthwise" and "A5-crosswise."

Figure 13:
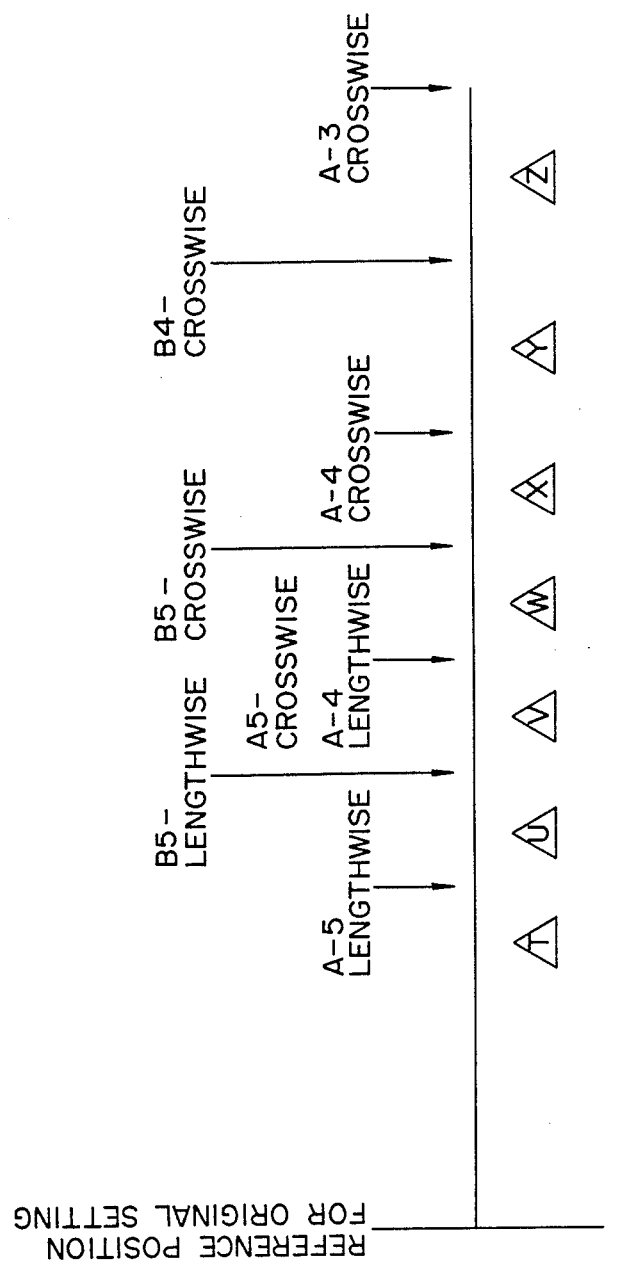

As shown in FIG. 13, detecting positions T, U, V, W, X, Y and Z may be positions for the detection of originals of size "A5-lengthwise" only, discrimination between originals of sizes "A5-lengthwise" and "B5-lengthwise," discrimination of size "B5-lengthwise" from sizes "A5-crosswise" and "A4-lengthwise," discrimination of sizes "A5-crosswise" and "A4-lengthwise" from size "B5-crosswise," discrimination between sizes "B5-crosswise" and "A4-crosswise," discrimination between sizes "A4-crosswise" and "B4-crosswise," and discrimination between sizes "B4-crosswise" and "A3crosswise." In the sheet size detecting process, the originals must be set according to a reference position for original setting. The original size is determined by the right-end position at which the original is detected by means of the output of one of detectors 63a and 63b.

Figure 14:
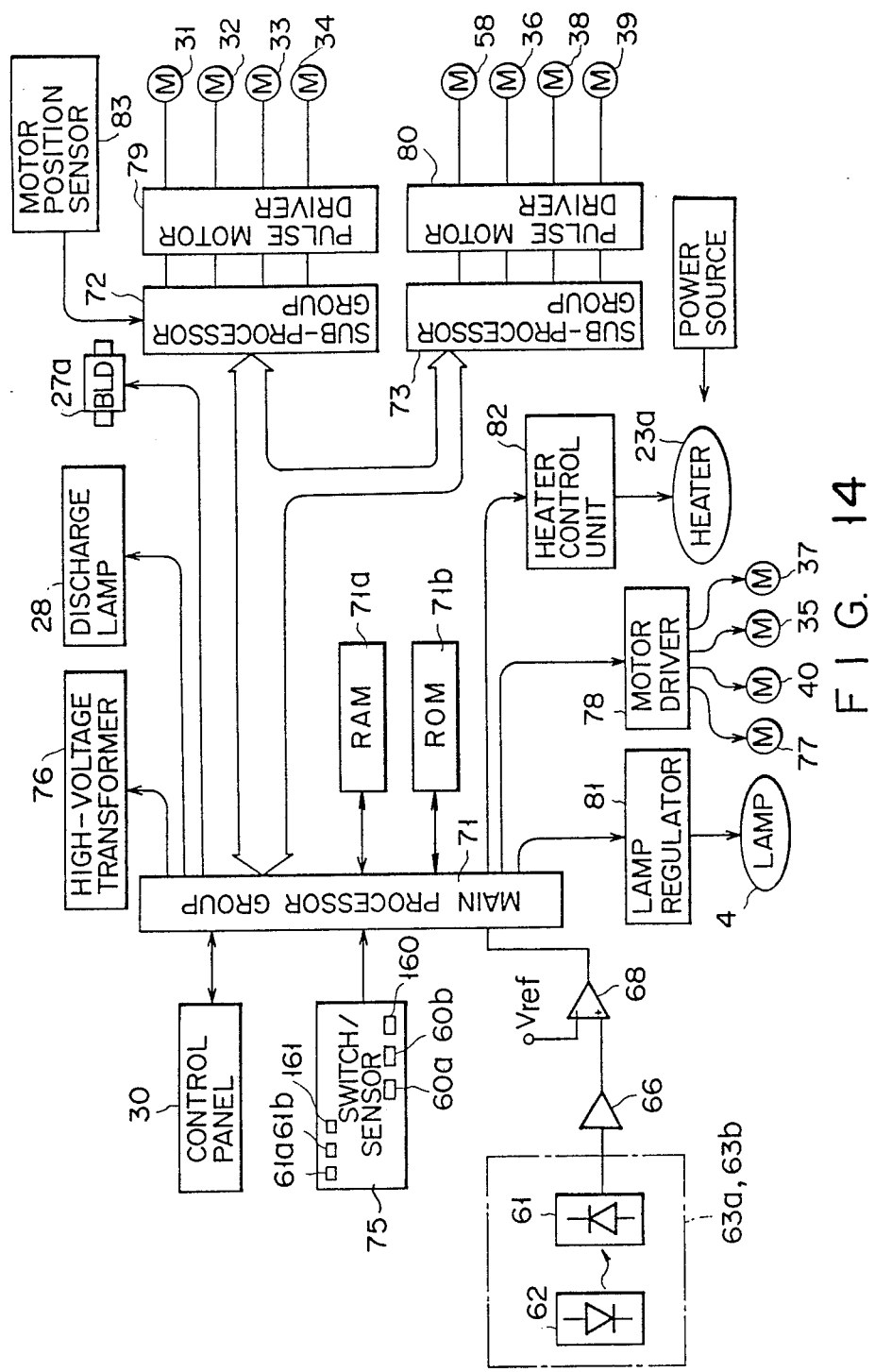

FIG. 14 shows the principal part of a control circuit. Main processor group 71 detects input signals from control panel 30 and input devices 75. Input devices 75 include switches and sensors, such as cassette size detecting switches 60a, 60b and 160 and empty detectors 6a, 61b and 161. Then, the main processor group controls high-voltage transformer 76 for driving the various chargers, discharge 1a lamp 28, blade solenoid 27a of cleaner 27, heater 23a for fixing rollers 23, exposure lamp 4, and various motors 31 to 40, 58 and 77, thereby executing the aforementioned copying operation.

In the copying operation the original size can be determined by the logical sum of the respective outputs of original detectors 63a and 63b before the start of original scanning. Also, sheets can be automatically selected in accordance with the determined original size, and the scale factor can be automatically selected in accordance with the original size and the sheet size.

Motor 31 is a lens motor which is used to shift the position of lens block 8 to change the scale factor.

Motor 32 is a mirror motor which is used to change the distance (optical path length) from mirror 5 to mirrors 6 and 7, for the change of the scale factor. Motor 33 is a scanning motor which is used to more first carriage 41a. Motor 34 is a shutter motor which is used to move a shutter (not shown) for adjusting the width of charging 11 at the time of scale factor change. Motor 35 is a developing motor for driving a developing roller and other components of developing device 12. Motor 36 is a drum motor for driving drum 10. Motor 37 is a fixing motor which is used to drive sheet feed path 22, fixing rollers 23, and exit rollers 24. Motor 38 is a paper supply motor which serves to drive pickup rollers 14a, 14b, 14c and 114 and rollers 15a, 15b and 115. Motor 39 is a sheet feed motor which serves to drive aligning rollers 19. Motor 40 is a fan motor which is used to drive cooling fan 29. Motor 77 is used to supply toner to developing device 12. Motors 35, 37, 40, and 77, are controlled by main processor group 71 through the medium of motor driver 78. Motors 31, 32, 33 and 34 and controlled by first sub-processor group 72 through the medium of pulse motor driver 79. Motors 36, 38, 39 and 58 are controlled by second subprocessor group 73 through the medium of pulse motor driver 80.

Exposure 1a mp 4 is controlled by main processor group 71 with the aid of 1a mp regulator 81. Heater 23a is controlled by group 71 with the aid of heater control unit 82.

Driver/stop commands for the individual motors are sent from main processor group 71 to first and second sub-processor groups 72 and 73. return signals including status signals indicative of the drive/stop state of the motors, are sent back from sub-processor groups 72 and 73 to group 71. For example, first sub-processor group 72 receives position information from motor position sensor 83 for detecting the positions of motors 31 through 34. Sub-processor groups 72 and 73 include microcomputers and programmable interval timers. The interval timers are used to count reference clock pulses in accordance with set points supplied from the microcomputers, thereby controlling the phase shift interval time of the pulse motor.

The number of counted reference clock pulses in then supplied to main processor 71 by first and second sub-processor groups 72 and 73.

The outputs of original detectors 63a and 63b are supplied successively through amplifier 66 and comparator 68 to main processor group 71. Amplifier 66 is used to convert the outputs of light sensing elements 61 into voltage signals. Comparator 68 compares the outputs of detectors 63a and 63b to a reference voltage (Vref), thereby correcting fluctuations of the output levels of sensing elements 61 attributable to variations of the sensitivity of the sensing elements or temperature changes.

Main processor group 71 is provided with RAM (random access memory) 71a and ROM (read-only memory) 71b. RAM 71a stores with position data used in detecting the position of first carriage 41a in accordance with the number of counted reference clock pulses supplied from first sub-processor group 72 to motor 33.

ROM 71b stores discrimination data for detecting the original size in accordance with the output levels of light sensing elements 61 (original detectors 63a and 63b).

FIG. 15 shows the discrimination data used in detecting the size of original G in main processor group 71. In FIG. 15, the output levels of original detectors 63a and 63b are indicate by circles and crosses. Each circle represents an output level corresponding to light reflected from original G. Each cross indicates the output level corresponding to light reflected from the cover 1b.

Figure 1:
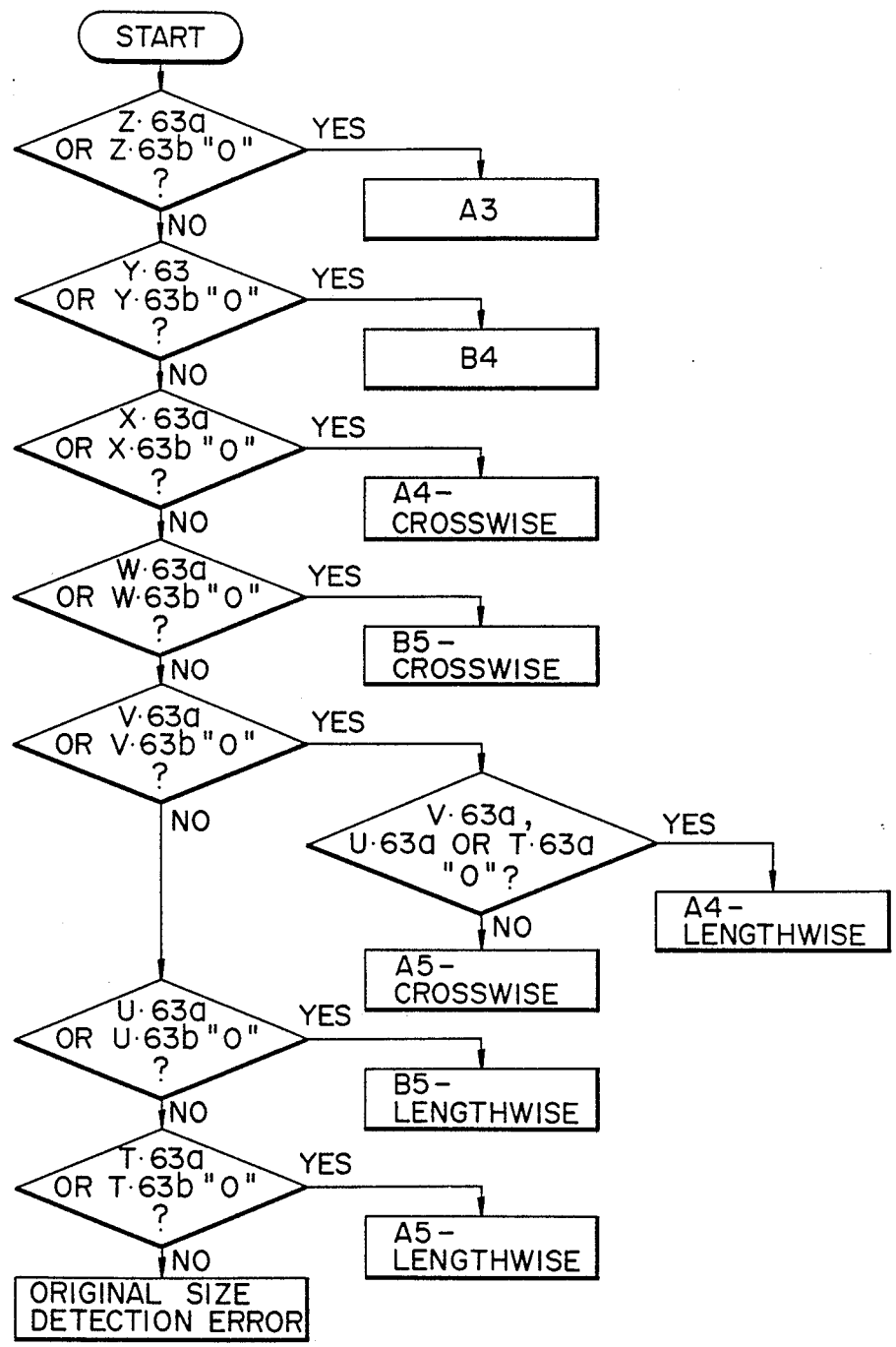

Referring now to the flow chart of FIG. 1, the operation for automatically detecting the original size will be described.

First, the presence of original G is detected by original detectors 63a and 63b. Pulse motor 33 is controlled by first sub-processor group 72 so that first carriage 41a starts to be moved. If original G is detected at the home position, carriage 41a is moved in the direction of arrow al of FIG. 4. If not, carriage 41a is moved in the direction of arrow a2.

During the movement of first carriage 41a, original detectors 63a and 63b are operated. Light emitting elements 62 are turned on and the light reflected from original G or cover 1a is received by light sensing elements 61. The outputs of sensing elements 61 along with the number of pulses supplied to motor 33, are supplied to main processor group 71.

The main processor group determines the position of the light sensing elements based on the number of motor 33 pulses and then logs the output levels from light sensing elements 61 at positions T, U, V, W, X, Y and Z. The results of such determination and the discrimination data (shown in FIG. 15) are used to identify the original size.

Figure 2A:
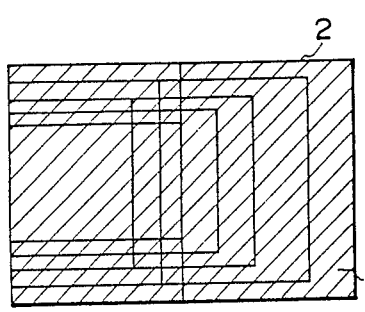
FIGS. 2A to 2H are diagrams illustrating the operation for original size detection.

If original G is detected (circle) from the output of either original detector 63a or 63b when first carriage 41a is situated at detecting position Z, then the detected original cannot be of any other size than size "A3," as shown is FIG. 15. Therefore, original G on original table 2 is identified as an original of size "A3," as shown in FIG. 2A.

Figure 2B:
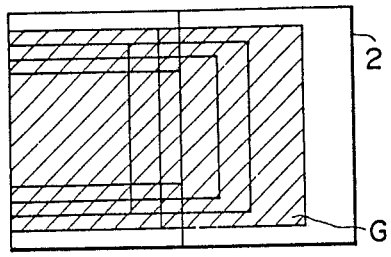

If original G is not detected (cross) from the outputs of original detectors 63a and 63b when first carriage 41a is situated at detecting position Z, and if original G is detected (circle) from the output of either detector when carriage 41a is situated in position Y, original G on original table 2 is identified as an original of size "B4," as shown in FIG. 2B.

Figure 2C:
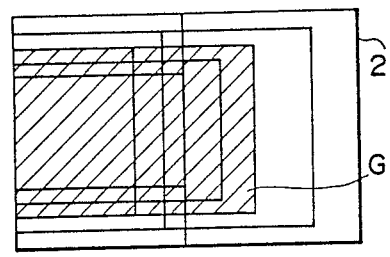

If original G is not detected (cross) from the outputs of original detectors 63a and 63b when first carriage 41a is situated at detecting position Z or Y, and if original G is detected (circle) from the output of either detector when carriage 41a is situated in position X, original G on original table 2 is identified as an original of size "A4-crosswise (A4-R)," as shown in FIG. 2C.

Figure 2D:
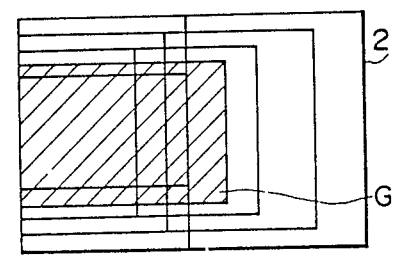

If original G is not detected (cross) from the outputs of original detectors 63a and 63b when first carriage 41a is situated at detecting position Z, Y or X, and if original G is detected (circle) from the output of either detector when carriage 41a is situated in position W, original G on original table 2 is identified as an original of size "B5-crosswise (B5-R)," as shown in FIG. 2D.

Figure 2E:
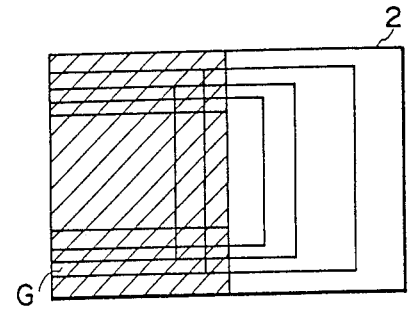
Figure 2F:
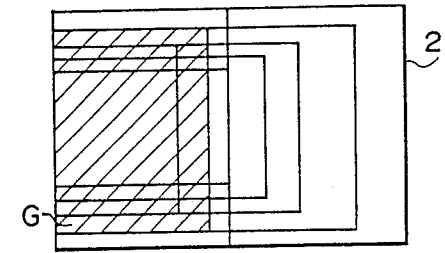
Figure 2G:
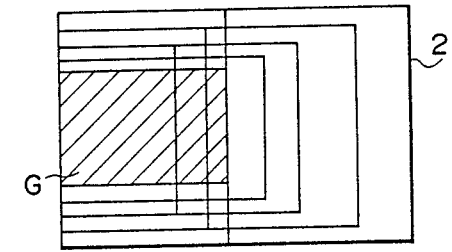

If original G is not detected (cross) from the outputs of original detectors 63a and 63b when first carriage 41a is situated at detecting position Z, Y, X or W, and if original G is detected (circle) from the output of either detector when carriage 41a is situated in position V, original G on original table 2 is identified as an original of size "A4-lengthwise" or "A5-crosswise (nonstandardized)," as shown in FIG. 2E or 2G. In this case, if original G is detected (circle) from the output of detector 63a when carriage 41a is situated in position V, the detected original cannot be of any other size than size "A4-lengthwise," as shown in FIG. 15. Therefore, original G on original table 2 is identified as an original of size "A4-lengthwise," as shown in FIG. 2E. On the other hand, if original G is not detected (cross) by original detector 63a when carriage 41a is situated at detecting position V, U or T, original G on table 2 is identified as an original of size "A5-crosswise (nonstandardized)," as shown in FIG. 2G.

If original G is not detected (cross) from the outputs of original detectors 63a and 63b when first carriage 41a is situated at detecting position Z, Y, X, W or V, and if original G is detected (circle) from the output of both detectors when carriage 41a is situated in position U, original G on original table 2 is identified as an original of size "B5-lengthwise," as shown in FIG. 2F.

Figure 2H:
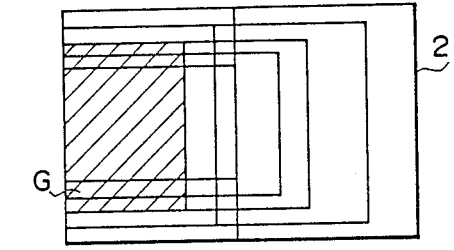

If original G is not detected (cross) from the outputs of original detectors 63a and 63b when first carriage 41a is situated at detecting position Z, Y, X, W, V or U, and if original G is detected (circle) from the output of either detector when carriage 41a is situated in position T, original G on original table 2 is identified as an original of size "A5-lengthwise (nonstandardized)," as shown in FIG. 2H.

If original G is not detected (cross) from either of the outputs of original detectors 63a and 63b when first carriage 41a is situated at detecting position Z, Y, X, W, V, U or T, it is concluded that the original size cannot be detected on account of a detection error.

In any of these cases, the size of original G can be accurately detected on the basis of a combination of the position of first carriage 41a and information indicative of the presence of the original, i.e., the logical sum of the respective outputs of two light sensing elements 61 (original detectors 63a and 63b) at detecting positions T to Z, as shown in FIG. 15.

In detecting the size of the original on the original table, as described above, the length of the original is more reliably and accurately determined based on the logical sum of the outputs of the two original detectors. The reliability of the original size detection is improved such that the automatic selection of sheet size corresponding to the detected original size is practical.

More specifically, the length of the original in the scanning direction is obtained by means of at least two detectors. The right end portion of the original is detected from the logical sum of the outputs of the detectors. By doing this, the influence of a black or blue solid image, which may be accidentally produced at the detecting position for one of the detectors, can be minimized. Accordingly, the original size can be more accurately detected, so that the reliability of the size detection can be improved, and the copying function can be stabilized.

In the embodiment described above, the machine is provided with the two original detectors. However, the number of original detectors is not limited to this, and more accurate original size detection can be effected by increasing the number of detectors.

In the above embodiment, moreover, the photosensitive drum is formed of a selenium-based photoconductor, the original cover is tinged with pale blue, and the light sources for detection emit red or yellowish-brown light. The present invention is not limited to this correlative arrangement. If the photosensitive drum is formed of an organic photoconductor (OPC), for example, the original cover is preferably tinged with yellow, and the light sources for detection are preferably designed so as to emit light with a wavelength corresponding to blue or purple.

It is to be understood, however, that the color of the light source and the color of the cover need not be considered if there is another means for preventing an image of that portion of the original cover around the original from being transferred to the paper sheet, during the transfer of the original image of the sheet.

The light sources for detection need not always be two or more in number. For example, one linear light source will do, provided it includes detecting sections capable of independent detection. These detecting sections or detectors need not always be spaced in the direction perpendicular to the scanning direction.

What is claimed is:

1. An apparatus for detecting a size of an image-bearing medium, comprising:
   holding means for holding the image-bearing medium, the holding means having a surface upon which the image-bearing medium is disposed;
   at least two detecting means for detecting a presence or absence of the image-bearing medium through the surface of the holding means, the two detecting means outputting respective signals indicative of the presence or absence of the image-bearing medium;
   scanning means for transporting the two detecting means over a scanning dimension of the image-bearing medium, the scanning means holding the two detecting means so that the respective output signals, which the two detecting means produce while being transported, are indicative of the presence or absence of the image-bearing medium at a given location in the scanning dimension; and
   processing means for determining the size of the image-bearing medium in response to the respective output signals of the two detecting means and the corresponding location of the two detecting means.

2. The apparatus of claim 1, wherein the detecting means are disposed on the scanning means at predetermined positions in a direction substantially perpendicular to the scanning dimension.

3. The apparatus of claim 1, wherein the processing means discriminates between image-bearing media of different predetermined sizes.

4. The apparatus of claim 3, wherein the processing means contains a stored set of detector outputs at various predetermined locations on the holding means, the stored set of detector outputs being values of the respective output signals from the two detecting means at each of the various predetermined locations which would result if each of the predetermined sizes of image-bearing media were disposed upon the holding means.

5. The apparatus of claim 4, wherein the processing means compares the respective output signals of the tires detecting means at the predetermined locations to the stored set of detector outputs to determine which of the predetermined sizes of image-bearing media is disposed on the holding means.

6. An image forming apparatus for duplicating an image disposed on an image-bearing medium, the apparatus comprising:
   holding means for holding the image-bearing medium, the holding means having a surface upon which the image-bearing medium is disposed;
   at least two detecting means for detecting a presence or absence of the image-bearing medium through the surface of the holding means, the two detecting means outputting respective signals indicative of the presence or absence of the image-bearing medium;

scanning means for transporting the two detecting means over a scanning dimension of the image-bearing medium, the scanning means holding the two detecting means so that the respective output signals, which the two detecting means produce while being transported, are indicative of the presence or absence of the image-bearing medium at a given location in the scanning dimension;

electrostatic copying means for transferring the image disposed on the image-bearing medium onto a blank sheet, the electrostatic copying means having a magnification control input for expanding and reducing the size of the image;

processing means for controlling the magnification control input of the electrostatic copying means such that the image on the image-bearing medium is scaled to the blank sheet, the processing means controlling the magnification control input based on a determination of which one of a predetermined set of image-bearing media sizes the image-bearing medium is, the processing means determining the image-bearing size in response to the respective output signals of the two detecting means and the location of the detecting means.

7. An image forming apparatus for duplicating an image disposed on an image-bearing medium, the apparatus comprising:

covering means for covering the image-bearing medium, the image-bearing medium having a reflection factor for incident light of a first wavelength, the covering means having a reflection factor at said first wavelength similar to the reflection factor of the image-bearing medium, the covering means having a reflection factor which differs from a reflection factor exhibited by the image-bearing medium for incident light of a second wavelength;

first light emitting means for irradiating the image-bearing medium and the covering means with the light of the first wavelength;

photosensitive means for forming an electrostatic image corresponding to differences in the reflection factors of the reflected light of the first wavelength, the differences in the reflecting factors of the first wavelength being due to the image disposed on the image-bearing medium; and page detector means comprising:

second light emitting means for irradiating the image-bearing medium and the covering means with light of the second wavelength, and light detecting means for detecting differences in intensity of the reflected light of the second wavelength, the light detecting means outputting a signal indicative of the reflective factors of the covering means and the image-bearing means.

8. The apparatus of claim 7, further comprising:

at least one additional page detector means;

scanning means for transporting the page detector means and the additional page detector means over a scanning dimension of the image-bearing medium, the scanning dimension of the image-bearing medium, the scanning means holding the page detector means and the additional page detector means at different positions perpendicular to the scanning dimension, the page detectors being disposed so that the output signals of the light detecting means of the page detectors detect the presence or absence of the image-bearing medium at a given location in the scanning dimension.

9. The apparatus of claim 8, further comprising:

position detecting means for detecting the position of the scanning means in the scanning dimension, the position detecting means outputting signals indicative of the position of the scanning means in the scanning dimension;

processing means for determining the size of the image-bearing medium, the processing means using the output of the position detecting means and using the output signals of the light detecting means.

10. An apparatus for detecting a size of an image-bearing medium, comprising:

holding means for holding the image-bearing medium, the holding means having a surface upon which the image-bearing medium is disposed;

at least two detecting means for detecting a presence or absence of the image-bearing medium through the surface of the holding means, the two detecting means outputting respective signals indicative of the presence or absence of the image-bearing medium;

scanning means for transporting the two detecting means over a scanning dimension of the image-bearing medium, the scanning means holding the two detecting means so that the respective output signals of the two detecting means are indicative of the presence or absence of the image-bearing medium at a given location in the scanning dimensions; and processing means for determining the size of the image-bearing medium, the processing means including means for identifying a moved distance of the two detectors and a discriminating circuit for discriminating the size of the image-bearing medium on the basis of a logical sum of the image-bearing medium on the basis of a logical sum of the respective output signals and the moved distance identified by the identifying means.

* * * * *